(12) United States Patent
Murchison

(10) Patent No.: US 7,866,086 B2
(45) Date of Patent: Jan. 11, 2011

(54) METHOD AND APPARATUS FOR TRAPPING ANIMALS

(76) Inventor: Michael Murchison, 10902 Joint Rd., Red Bluff, CA (US) 96080

( * ) Notice: Subject to any disclaimer, the term of this patent is extended or adjusted under 35 U.S.C. 154(b) by 1114 days.

(21) Appl. No.: 11/130,510

(22) Filed: May 16, 2005

(65) Prior Publication Data

US 2006/0254122 A1 Nov. 16, 2006

(51) Int. Cl.
- *A01M 23/08* (2006.01)
- *A01M 23/02* (2006.01)
- *A01M 23/18* (2006.01)
- *A01M 23/16* (2006.01)

(52) U.S. Cl. .................... 43/66; 43/65; 43/61

(58) Field of Classification Search .......... 43/66, 43/65, 64, 67, 60, 61, 100, 102

See application file for complete search history.

(56) References Cited

U.S. PATENT DOCUMENTS

| | | | | | |
|---|---|---|---|---|---|
| 21,978 | A | * | 11/1858 | Payne | 43/66 |
| 383,700 | A | * | 5/1888 | Brusie | 43/66 |
| 488,996 | A | * | 1/1893 | Fry | 43/66 |
| 501,599 | A | * | 7/1893 | Crockett et al. | 43/65 |
| 527,044 | A | * | 10/1894 | Brown | 43/65 |
| 574,294 | A | * | 12/1896 | Wilkinson | 43/66 |
| 795,615 | A | * | 7/1905 | Huffman | 43/66 |
| 879,136 | A | * | 2/1908 | Angel | 43/66 |
| 892,756 | A | * | 7/1908 | Morris | 43/66 |
| 897,396 | A | * | 9/1908 | Pierce | 43/65 |
| 1,063,347 | A | * | 6/1913 | Hall | 43/66 |
| 1,074,916 | A | * | 10/1913 | Wiesen | 43/65 |
| 1,139,501 | A | * | 5/1915 | Dennis | 43/65 |
| 1,142,781 | A | * | 6/1915 | Cameron | 43/66 |
| 1,146,698 | A | * | 7/1915 | Franklin | 43/66 |
| 1,151,041 | A | * | 8/1915 | Reefe | 43/66 |
| 1,223,525 | A | * | 4/1917 | Schallman | 43/66 |
| 1,226,288 | A | * | 5/1917 | White | 43/66 |
| 1,234,629 | A | * | 7/1917 | Clapp | 43/65 |
| 1,237,399 | A | * | 8/1917 | Sloan | 43/65 |
| 1,293,894 | A | * | 2/1919 | Ollier | 43/61 |
| 1,335,359 | A | * | 3/1920 | Beisel | 43/66 |
| 1,363,626 | A | * | 12/1920 | Thomas | 43/66 |

(Continued)

FOREIGN PATENT DOCUMENTS

CH 686922 A5 * 8/1996

(Continued)

*Primary Examiner*—Darren W Ark
(74) *Attorney, Agent, or Firm*—Gentle Winter

(57) ABSTRACT

A repeating animal trap is described that humanely captures animals and allows for their safe release. In one embodiment, the animal trap includes a wire body that forms a cage. The cage includes one or more animal entrances. The one or more animal entrances are each configured such that an animal enters from outside the cage and traverses a passageway that ends about the middle of the cage. The natural instincts of the animal causes the animal to go toward the perimeter and corners of the cage to escape. The natural instinct assists in keeping the animals from finding their way back into the passageway to leave the cage. To further keep animals from leaving the cage via the passageway, a passageway door is provided for each passageway. Each door is configured with a bias and a shape that precludes the animal from opening the passageway door once inside the cage.

20 Claims, 7 Drawing Sheets

U.S. PATENT DOCUMENTS

| | | | | |
|---|---|---|---|---|
| 1,397,471 A * | 11/1921 | Walker | ........................ | 43/61 |
| 1,412,649 A * | 4/1922 | Bitonti | ........................ | 43/66 |
| 1,497,883 A * | 6/1924 | Sosbee | ........................ | 43/66 |
| 1,505,996 A * | 8/1924 | Drought | ........................ | 43/66 |
| 1,619,366 A * | 3/1927 | Petersen | ........................ | 43/66 |
| 1,713,167 A * | 5/1929 | Bushman | ........................ | 43/61 |
| 1,726,909 A * | 9/1929 | Loftsgaarden | ................. | 43/66 |
| 1,744,412 A * | 1/1930 | Patterson | ........................ | 43/66 |
| 1,788,047 A * | 1/1931 | Brunner | ........................ | 43/66 |
| 1,816,269 A * | 7/1931 | Topp | ........................ | 43/66 |
| 1,860,599 A * | 5/1932 | Schiltz | ........................ | 43/66 |
| 1,911,919 A * | 5/1933 | Molls | ........................ | 43/66 |
| 2,193,937 A * | 3/1940 | Pirani et al. | .................... | 43/66 |
| 2,524,423 A * | 10/1950 | Buford | ........................ | 43/60 |
| 2,530,449 A * | 11/1950 | Bush | ........................ | 43/102 |
| 2,562,663 A * | 7/1951 | Golaszewski | ................ | 43/66 |
| 2,567,664 A * | 9/1951 | Ewell | ........................ | 43/61 |
| 2,769,274 A * | 11/1956 | Ougland | ........................ | 43/65 |
| 2,787,082 A * | 4/1957 | Paschen | ........................ | 43/66 |
| 2,825,176 A * | 3/1958 | Floied | ........................ | 43/61 |
| 2,842,891 A * | 7/1958 | Neid | ........................ | 43/66 |
| 3,393,468 A * | 7/1968 | Wood et al. | .................... | 43/66 |
| 3,678,612 A * | 7/1972 | Hendrickson | ................. | 43/66 |
| 3,786,591 A * | 1/1974 | Morford | ........................ | 43/66 |
| 3,862,511 A * | 1/1975 | Vavrick | ........................ | 43/61 |
| 3,991,508 A * | 11/1976 | Petrosky | ........................ | 43/66 |
| 4,091,560 A * | 5/1978 | Haertling | ........................ | 43/66 |
| 4,452,005 A * | 6/1984 | Poirot | ........................ | 43/100 |
| 4,779,373 A * | 10/1988 | Krenson | ........................ | 43/66 |
| 5,410,837 A * | 5/1995 | Kazzyk | ........................ | 43/66 |
| 5,946,850 A * | 9/1999 | Sarkisyan | ................... | 43/100 |
| 5,979,105 A * | 11/1999 | Marks | ........................ | 43/66 |
| 6,035,575 A * | 3/2000 | Hilty | ........................ | 43/100 |
| 6,272,789 B1 * | 8/2001 | Huang | ........................ | 43/66 |
| 2005/0178047 A1* | 8/2005 | Aguillera | ....................... | 43/61 |
| 2005/0268528 A1* | 12/2005 | Hibbs et al. | ................... | 43/100 |

FOREIGN PATENT DOCUMENTS

| | | | |
|---|---|---|---|
| DE | 19542089 A1 * | 5/1997 | |
| FR | 2601229 A1 * | 1/1988 | |
| GB | 1419434 A * | 12/1975 | |
| GB | 2017477 A * | 10/1979 | |
| GB | 2085704 A * | 5/1982 | |
| JP | 4-183352 A * | 6/1992 | |
| JP | 9-121748 A * | 5/1997 | |
| JP | 10-117664 A * | 5/1998 | |
| JP | 2001-157544 A * | 6/2001 | |
| WO | WO-97/39622 A1 * | 10/1997 | |
| WO | WO-2006/010279 A1 * | 2/2006 | |

* cited by examiner

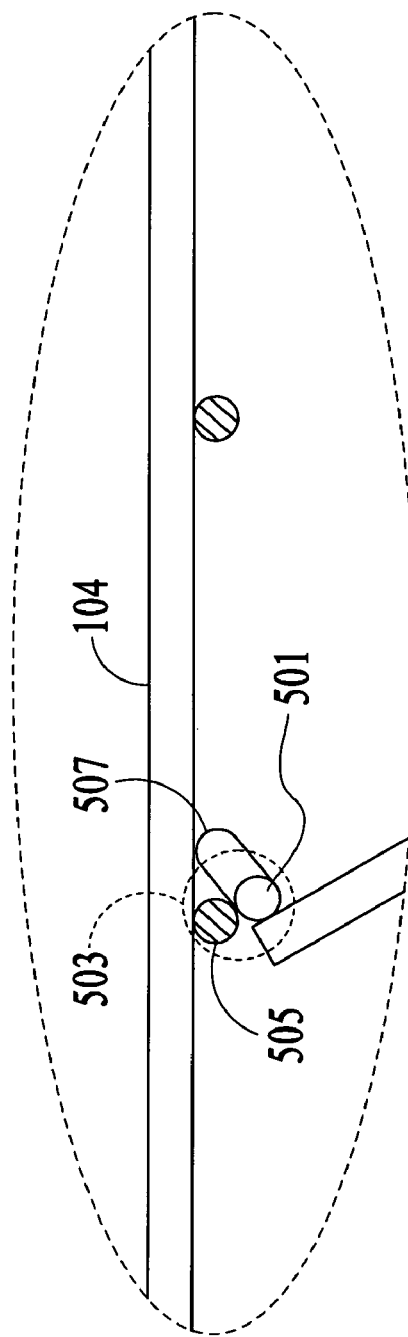
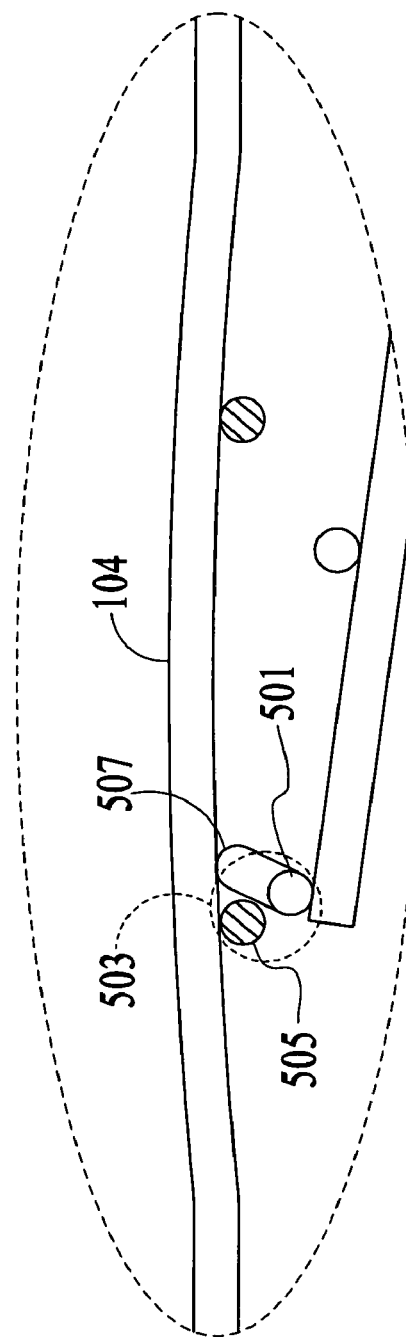
FIG.7A
FIG.7B

METHOD AND APPARATUS FOR TRAPPING ANIMALS

BACKGROUND OF THE INVENTION

1. Field of the Invention

Embodiments of the invention generally relate to animal traps and cages configured to humanely capture animals.

2. Description of the Related Art

Generally, animal traps are used to capture animals that are either wild and/or are a nuisance. For example, animal traps are used to capture squirrels, mice, and other types of animals that may be a nuisance. Generally, trap housings are sized to accommodate the size of the animal to be trapped. In the case of traps designed for chipmunks, mice and other small animals, the trap housings are usually oversized in order to permit baiting of the trap because a trap housing sized for a chipmunk would be too small to accommodate an adult hand. Animal traps used to capture nuisance animals are generally configured to allow the animal to be captured without harm and then be relocated. These types of traps are generally referred to as humane animal traps.

Conventional humane animal traps are well-known and generally include two types of trap, the non-repeating trap and the repeating trap. To trap animals In the non-repeating trap, homeowners and trappers generally often rely on animal traps that are operated by raising a trap door, in slides, to an open position, setting the door in the open position by means of the trigger mechanism and baiting the trap on triggering mechanism, such as a bait pan. When an animal is lured into the trap by the bait and steps on the bait pan, the trigger mechanism is sprung allowing the door to drop closed under gravity and trap the animal. Unfortunately, many triggering mechanisms are complicated and therefore difficult and expensive to manufacture. Many non-repeating traps are difficult to set and unreliable in operation. Often, it is desirable to capture more than one animal at time. Unfortunately, non-repeating traps require resetting once the trap has been sprung.

With regard to conventional repeating traps, the commercial embodiments of such traps currently available comprise a housing defining an enlarged enclosure with one, or perhaps two, inclined plane trap assemblies communicating the interior of the enclosure with the exterior of the housing via an elongated passageway. An inclined plane tilting floor member is positioned in the passageway of each trap assembly and is adapted to lift a door to block an entrance opening when an animal, such as a rodent, passes beyond a pivot point. The blocked entrance limits the animal's ability to escape from the enclosure. When the animal exits the passageway into the enclosure, the door falls by gravity on the entrance end of the tilting floor to reset the trap and the raised end of the tilting floor limits the ability of captured animal to return to the passageway.

Once trapped, captured animals will usually attempt to escape in any way possible. For example, captured squirrels and other rodents in conventional repeating traps will try to grasp the inner end of the tilting floor to regain access to the passageway. In some instances, animals on the tilting floor have been able to grasp the side or top edges of the door with their claws or teeth to pull the door down against their own weight, and thereby escape from the trap. The trapping industry has attempted to limit access to the tilting floor and the door of conventional repeating traps by incorporation of various flanges or lips on the trap assembly walls or roof, but such efforts have had limited success. One reason for the limited success is that when traps are sized to hold only a few animals at a time the animals are constrained to remain in the area of the door through which they have just entered. Moreover, the animal perceives the door as being between it and a path to escape. Natural instinct compels the animal to attack the door in an attempt to move towards the outside. Eventually, with conventional trap designs the animal finds a combination of acts that opens the door, thus permitting escape.

Another problem associated with conventional repeating animal traps is the tendency of a captured animal to crawl under, or nest in, the space between the bottom wall of the trap housing and the undersurface of the raised end of the tilting floor when the trap assembly has been reset. The presence of an animal in this location prevents another animal attempting to enter the trap assembly from tilting the floor and, thereby, being captured. Further, a dead animal in this space effectively destroys the use of the repeating animal trap without extensive maintenance.

Yet another problem associated with conventional repeating animal traps is that many are sized to hold only a few animals. Once full, other animals are no longer tempted to enter or even capable of entering. An effective repeating animal trap may be capable of capturing many animals, even dozens of animals, without resetting or other human intervention. Thus, many potential animals being targeted for trapping remain uncaptured.

Therefore, there is a need for an animal trap that humanely captures one or more animals without resetting while effectively preventing the animals from escaping once trapped and has a capacity to hold many animals at a time.

SUMMARY OF THE INVENTION

An embodiment of the present invention is an animal trap apparatus. The animal trap includes an enclosure having at least one passageway configured to receive at least one animal to be trapped therein. The at least one at least one passageway being configured to direct the at least one animal toward the center of the enclosure. The animal trap apparatus includes a door disposed within the at least one passageway. The door being configured with a pivotal end to allow the animal to enter the enclosure by pivoting the door from a closed position to an open position. The door being sized to block the at least one passageway sufficiently to prevent the at least one animal from escaping from the enclosure once the at least one animal has entered the enclosure and the door has returned to the closed position. The animal trap apparatus also includes a bias mechanism integral to the pivotal end. The bias mechanism is configured to bias the door in the closed position. The animal trap apparatus includes an extension end of the door disposed distal the pivot end. The extension end is configured to extend beyond a wall defining at least a portion of the enclosure. The extension end is further configured to prevent the at least one animal trapped within the enclosure from operating the door once the animal has entered the enclosure and the door is biased to the closed position.

Another embodiment of the present invention is an animal trap that includes an enclosure having at least one entrance passageway. The entrance passageway is configured to direct at least one animal toward the center of the enclosure. The apparatus includes a passageway door configured to be repeatedly opened inwardly relative the center of the enclosure to expose the entrance passageway and allow the at least one animal to pass therethough into the enclosure. A bias apparatus is coupled to the passageway door. The bias apparatus is configured to bias the passageway door sufficiently to allow the at least one animal to open the passageway door and enter the entrance passageway. The bias apparatus may be configured to bias the door to a closed position to obstruct the entrance passageway and prevent the animal from exiting the enclosure once the animal has passed the passageway door and into the entrance passageway leading to the center of the enclosure. The apparatus also includes an extension member extending from an end of the passageway door distal a rotational axis of the passageway door. The extension member is configured to extend through an opening in the enclosure and extend externally therefrom. The apparatus includes a stop member disposed across the passageway door. The stop member is configured to cooperate with the extension member to prevent the passageway door from being opened by the at least one animal once the at least one animal has passed the passageway door allowing the passageway door to rotate to the closed position.

Another embodiment of the present invention is an enclosure that includes a means for directing one or more animals to a center portion of the enclosure and a means for enclosing an end of the directing means while allowing the one or more animals to enter the enclosure. The enclosing means may be configured to prevent the one or more animals from escaping the enclosure once they have passed the enclosing means. The enclosure includes a means for biasing the enclosing means such that the enclosing means may be repeatedly opened to accept the one or more animals without being reset. The enclosure also includes a means for extending a portion of the enclosing beyond a wall of the enclosure. The extended portion of the enclosing means being configured to cooperate with the enclosure such that the one or more animals may open the enclosing means to enter the enclosure. The one or more animals also are prevented from escaping the enclosure by opening the enclosing means once they have passed the enclosing means and the enclosing means has moved to a closed position.

BRIEF DESCRIPTION OF THE DRAWINGS

A further understanding of the present invention can be obtained by reference to embodiments set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

FIG. 7A is a partial enlarged view of one embodiment of the hinge mechanism in a closed position in accordance with embodiments of the invention.

FIG. 7B is a partial enlarged view of one embodiment of the hinge mechanism in an open position in accordance with embodiments of the invention.

DETAILED DESCRIPTION

Figure 1:
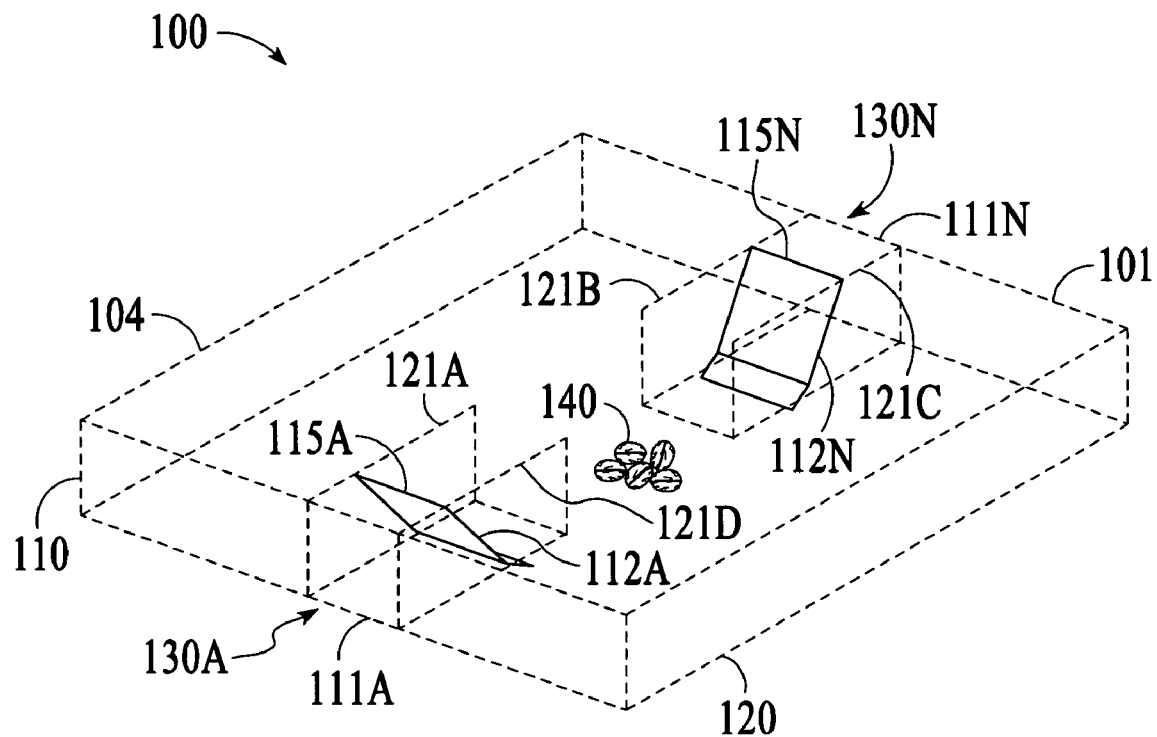
FIG. 1 is a high-level perspective view of one embodiment of an animal trap apparatus in accordance with embodiments of the invention.
Figure 2A:
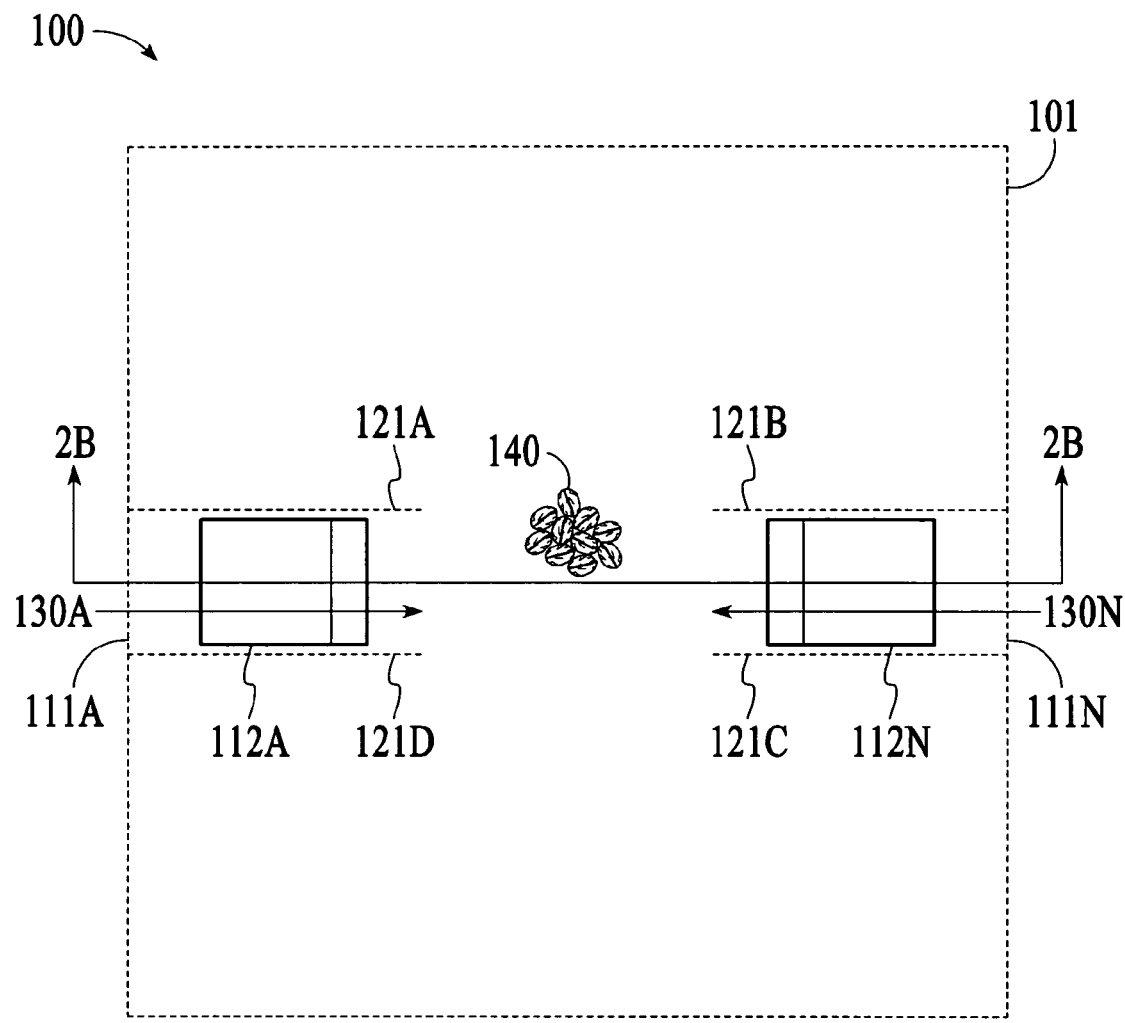
FIG. 2A is a high-level top plan view of one embodiment of an animal trap apparatus in accordance with embodiments of the invention.
Figure 2B:
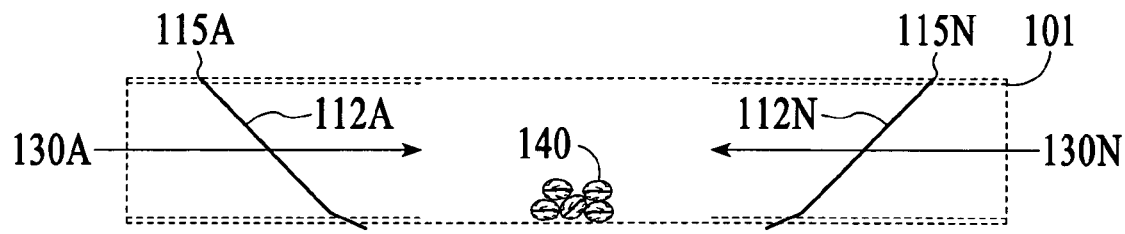
FIG. 2B is a high-level side elevation view of one embodiment of an animal trap apparatus in accordance with embodiments of the invention.

FIG. 1 is a high-level perspective view and FIGS. 2A and 2B are a top plan view and a side elevation view respectively of one embodiment of an animal trap apparatus 100 in accordance with embodiments of the invention. The animal trap apparatus 100 includes an enclosure 101. The enclosure 101 may be formed of a variety of rigid materials that may be used to advantage. The enclosure 101 may be formed with sidewalls that are solid, lattice, etc. and combinations thereof that are configured to trap animals therein while allowing for adequate ventilation as described further below. For clarity, the enclosure 101 is shown formed in a general rectangular shape, however, other shapes such as round, square, triangular, etc., are contemplated.

In one embodiment, the enclosure 101 includes a bottom structure 120, a mid structure 110, and a top structure 104. The bottom structure 120 is configured to support the weight and movement of animals trapped within the enclosure 101. The mid structure 110 includes one or more entrance openings 111A and 111N where N is defined as the "nth" entrance opening. The entrance openings 111A and 111N are sized to allow one or more of a subject animal such as for example, hogs, foxes, raccoons, squirrels, muskrats, prairie dogs, pine martens, ferrets, mink, rats, mice, and the like, to enter the enclosure 101.

The enclosure 101 includes passage walls 121A-D. The passage walls 121A-D extend about perpendicular between the bottom structure 120 and the top structure 104. Adjacent pairs of the passage walls 121A-D, extend from a respective entrance opening 111A-N. The pairs of the passage walls 121A-D in cooperation with the bottom structure 120 and top structure 104, form one or more passageways 130. For example, as illustrated in FIG. 1 and FIG. 2, passageway 130A is formed from passage walls 121A and 121D in cooperation with bottom structure 120 and top structure 104, and passageway 130N is formed from passage walls 121B and 121C in cooperation with bottom structure 120 and top structure 104. Passageways 130A and 130N extend from the respective entrance openings 111A and 111N, respectively, toward the center of the enclosure 101. In one embodiment, the passageways 130 are configured to direct the animals entering the animal trap apparatus 100 toward the center of the enclosure 101. Some bait 140 may be placed inside enclosure 101 proximate the center of the enclosure 101 as illustrated in FIGS. 2A and 2B, or scattered around the interior of enclosure 101. Bait 140 encourages the subject animals to enter the animal trap apparatus 100 through passageways 130. Once an animal has entered the enclosure 101, and has become a captured animal its natural instinct is to go toward the periphery and particularly toward the corners of the enclosure 101 to escape. Therefore, a majority of the captured animals captured move away from the center of the enclosure 101 and are generally compelled by natural instinct to remain at the periphery and corners of the enclosure 101. This instinct is particularly effective when the periphery of the enclosure 101 is far enough removed from the center to permit movement without returning to the center. For example when the periphery of the enclosure 101 is about one or more body lengths of the subject animal away from the passageway 130 and passageway door 112, such as in a cage sized to hold ten to twenty or more of the subject animals, the captured animals at the periphery and corners may move around and continue searching for escape paths without approaching the center region of the enclosure 101. Such captured animals have no occasion to consider the center of enclosure 101 as an escape path. Thus, captured animals have no incentive to attempt to open and escape through the passageway door 112. This is confirmed in practice by the observation that invariably the captured animals are found to be grouped around the perimeter and particularly at the corners of the enclosure 101. Moreover, it is evident from the pattern of scratches in dirt underlying the animal trap apparatus 100 that the captured animals have spent a great majority of their time while captured near the perimeter and corners of the enclosure 101.

The enclosure 101 includes a passageway door assembly 112 disposed along each of the passageways 130. The passageway door assemblies 112 are configured such that an animal may open such passageway door assemblies 112 to enter the enclosure 101 via passageway 130 to get to bait 140 located inside the enclosure 101. Once the animal is within the passageway 130 and past the passageway door assembly 112, the passageway door assembly 112 is configured with a bias to move to a closed position awaiting the next animal to open such passageway door assembly 112. The passageway door assemblies 112 are rotatably attached on one end to the top structure 104. The bias is provided by a hinge assembly 115, examples of which are described below. The passageway door assemblies 112 extend inside the passageways 130 and beyond the bottom structure 120.

In one aspect, the hinge assembly 115 is spring biased to provide the passageway door assembly 112 a closing rotational force to keep the passageway door assembly 112 in a normally closed position when not activated on by an outside force such as an animal pushing on the passageway door assembly 112. For example, passageway door assembly 112A may be coupled on one end to the top structure 104 with hinge 115A and rotate about hinge assembly 115A within passageway 130A. Hinge assembly 115A is configured to bias the passageway door assembly 112A in a closed position. When an animal pushes on passageway door assembly 112A with sufficient force to overcome the spring bias, the passageway door assembly 112A opens upwardly toward the top structure 104 allowing the animal to enter the passageway 130A. Once the animal releases pressure on the passageway door assembly 112A, the bias force rotates the passageway door assembly 112A back to a closed position. Another advantage of the bias is that passageway door assemblies 112 will remain closed and operational even when the trap apparatus is inadvertently deployed upside down.

Figure 3:
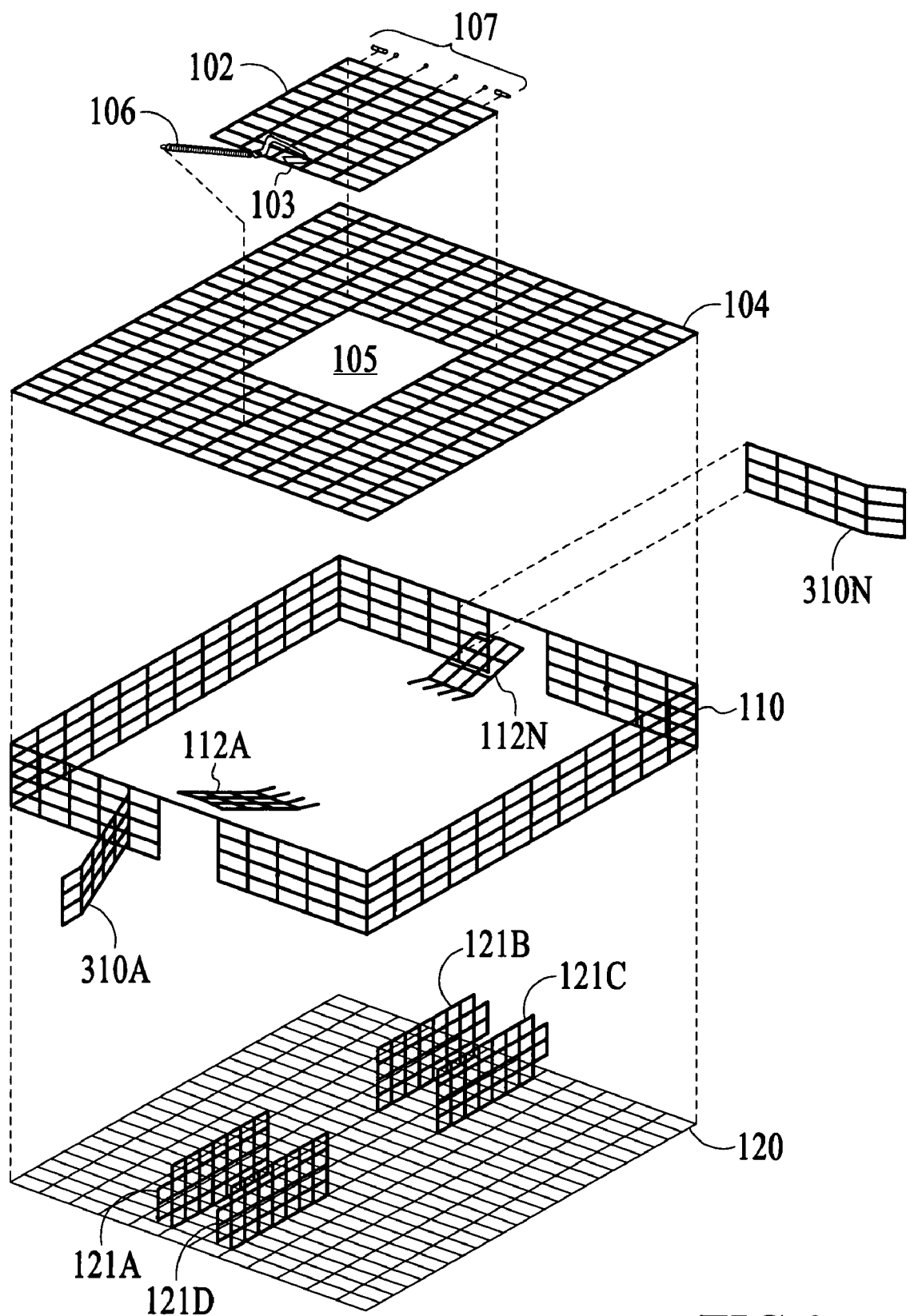
FIG. 3 is an exploded view of one embodiment of an animal trap apparatus formed from a mesh material in accordance with embodiments of the invention.
Figure 4:
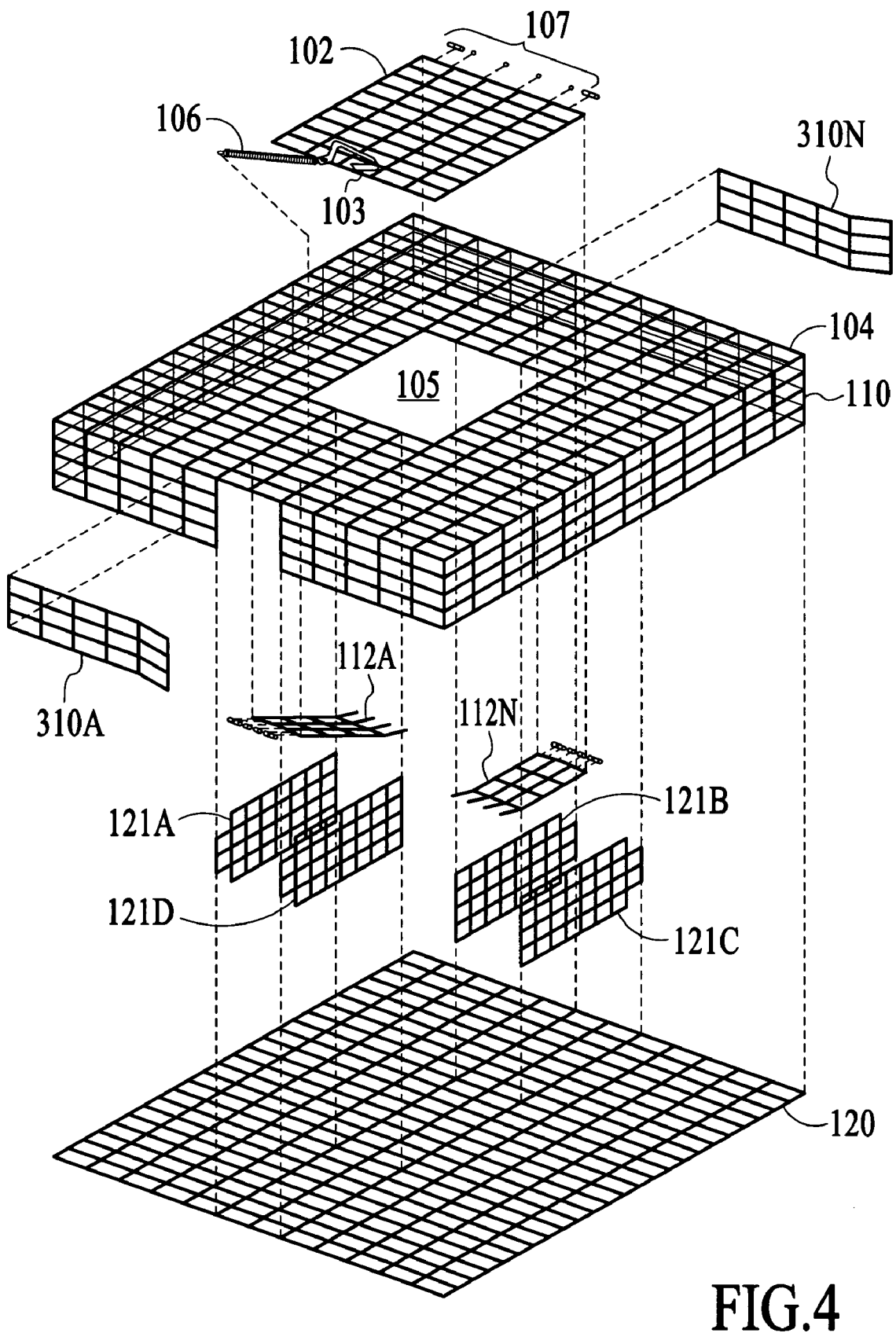
FIG. 4 is an exploded view of one embodiment of the animal trap apparatus of FIG. 3 in accordance with embodiments of the invention.

FIG. 3 and FIG. 4 are exploded views of one embodiment of the animal trap apparatus 100 formed from a mesh material in accordance with embodiments of the invention. For example, the enclosure 101 may be formed of a mesh material such as a rigid wire mesh, plastic mesh, hard wood lattice, and the like, that may be used to advantage to form a cage. As illustrated in FIG. 3-4, the enclosure 101 may be formed from a single mesh material, and/or formed from segments of mesh material connected together as is known. The enclosure 101 may be formed of mesh material having one or more ventilation holes and/or a lattice formation that is configured to prevent animals trapped therein from escaping. To keep the animals from suffocating, the enclosure 101 may also be configured to provide adequate ventilation by selecting the size of the lattice formation and/or ventilation holes as needed.

In one embodiment, the top structure 104 includes an animal release opening 105 disposed therein. The animal release opening 105 is sized to allow an animal to be released or removed from the enclosure 101 upon opening a release door 102 disposed adjacent thereto. The release door 102 may be sized to cover the animal release opening 105. In one embodiment, the release door 102 may be hingedly attached on one side to the top structure 104 with a hinge 107. While in alternative embodiments, the release door 102 may be configured to slide or to be latched on two or more sides, the hinge 107 allows the release door 102 to be more easily opened and closed. The release door 102 may be latched on one end in a closed or open position by a latch 103. Latch 103 may be virtually any latching apparatus configured to latch the release door 102 in a closed or open position. Latch 103 may be configured to hang the animal trap apparatus 100 using a hanging member 106.

The entrance openings 111A and 111N may be covered by one or more entrance opening seals 310A and 310N, respectively. For convenience, such opening seals may be deployed during an animal storing/carrying operation. In one embodiment, the entrance opening seals 310 may be configured with similar material to that of the enclosure 101, such as a mesh material. The entrance opening seals 310 may be hingedly affixed on one end to the enclosure 101 such that the entrance opening seals 310 may be moved to a closed position and an open position. The entrance opening seals 310 may also be configured with a latching apparatus to secure the entrance opening seals 310 in the closed position or the open position for advantage.

Figure 5A:
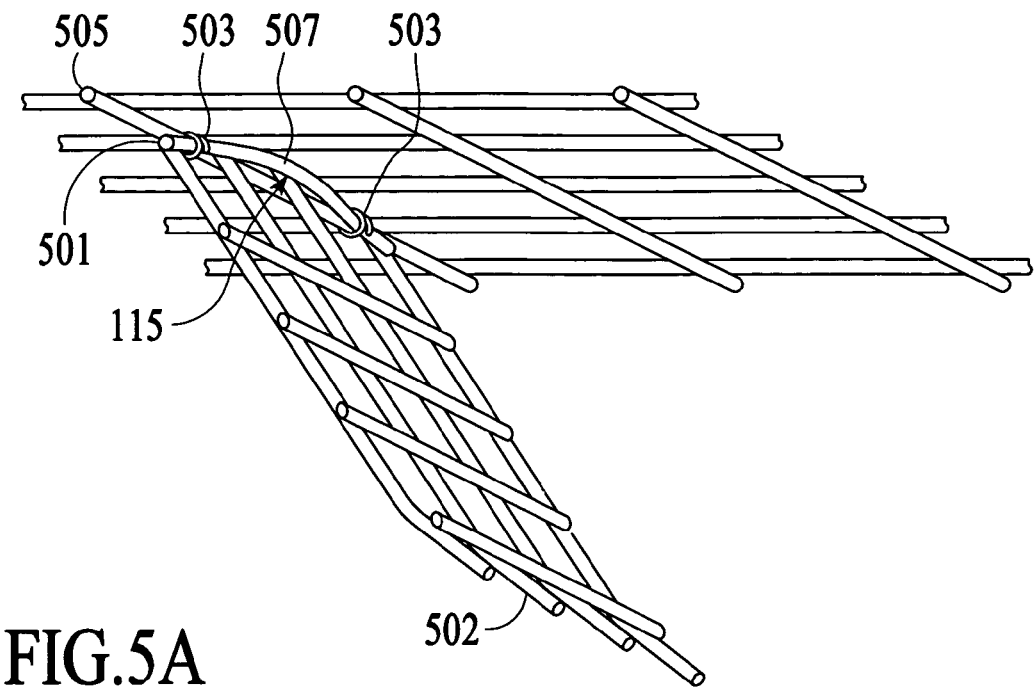
FIG. 5A is a partial perspective view of one embodiment of the passageway door assembly for the animal trap apparatus of FIG. 3 in accordance with embodiments of the invention.
Figure 5B:
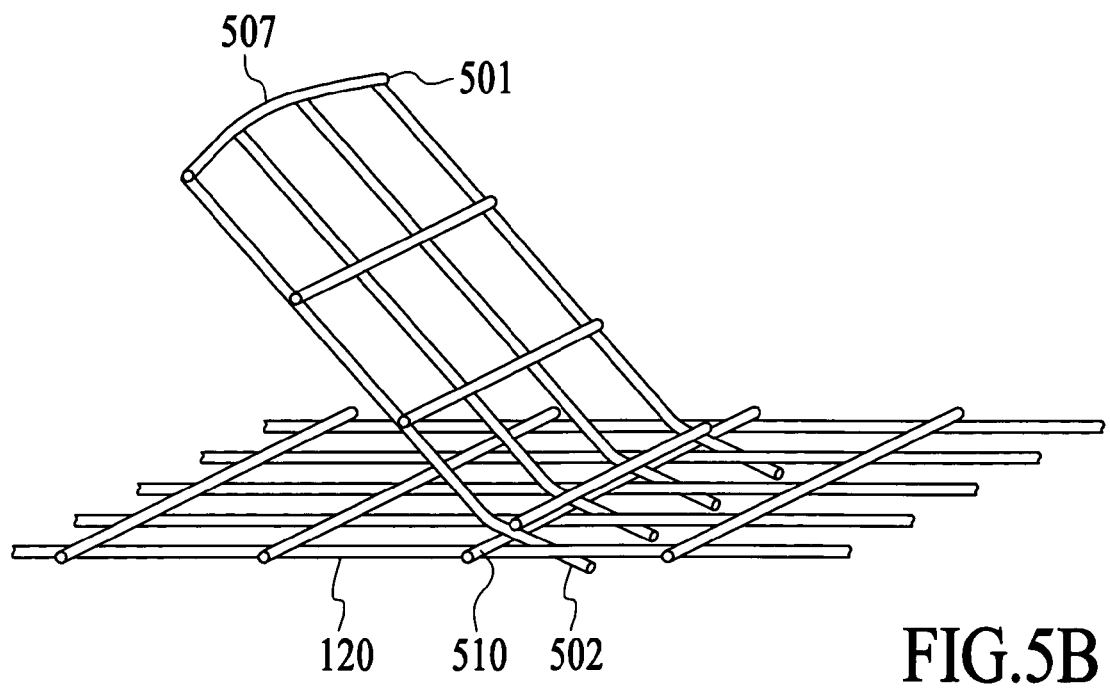
FIG. 5B is a partial perspective view of one embodiment of the passageway door assembly for the animal trap apparatus of FIG. 3 in accordance with embodiments of the invention.

FIG. 5A and FIG. 5B are partial perspective views of one embodiment of the passageway door assembly 112 for the animal trap apparatus 100 in accordance with embodiments of the invention. FIG. 5A and 5B illustrate the passageway door assembly 112 rotated in a closed position. In one embodiment, the passageway door 112 includes a spring member 501. Spring member 501 may be formed integral with the body of the passageway door assembly 112. Spring member 501 may be shaped from a semi-circular or bowed elongated member to generate some spring resilience. As illustrated in FIG. 5B, spring member 501 is disposed about parallel to and tied to a cross member 505 of the top structure 104 using one or more ties 503. In alternative embodiments, spring member 501 may be a coil spring, a torsion bar, a leaf spring, an elastic member, or other structure having spring properties capable of biasing passageway door 112 in a closed position. For example, spring member 501 may be a coil spring positioned to wind tighter as the passageway door 112 is moved from a closed position to an open position. In this example, the spring coil provides some rotational coil tension when the passageway door 112 is in the closed position. The coil spring continues to provide closing force as the passageway door 112 is rotated from the closed position to the open position. In a leaf spring configuration, for example, the spring member 501 may be formed of spring metal such that as the passageway door 112 is rotated to an open position, the spring member 501 generates a bias force in the closing direction.

Spring member 501, cross-member 505, and ties 503 cooperatively form the hinge assembly 115. The passageway door assembly 112 also includes an extension end 502. The extension end 502 is configured to extend though the enclosure 101 to the outside. The extension end 502 may be integral to the passageway door assembly 112. The extension end 502 may be configured as a fork structure capable of extending though the mesh material of the bottom structure 120. The bottom of the passageway door assembly 112 adjacent the extension end 502 contacts a stop member 510 to keep passageway door assembly 112 in a closed position and from rotating further.

Figure 6A:
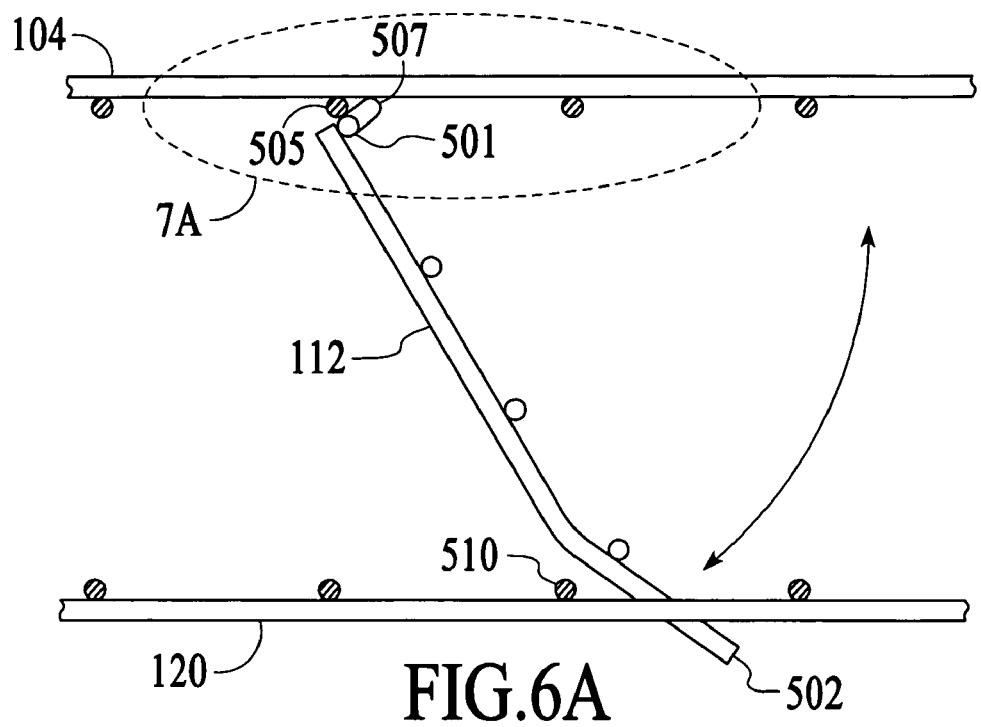
FIG. 6A is a side view of one embodiment of the passageway door assembly for the animal trap apparatus of FIG. 3 in a closed position in accordance with embodiments of the invention.
Figure 6B:
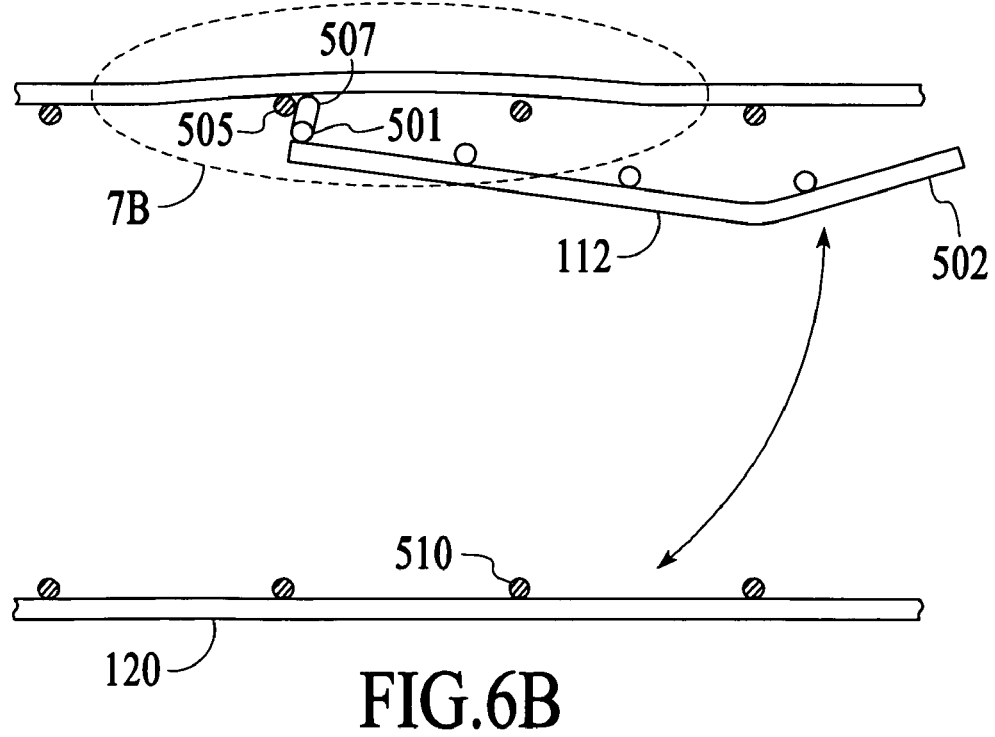
FIG. 6B is a side view of one embodiment of the passageway door assembly for the animal trap apparatus of FIG. 3 in an open position in accordance with embodiments of the invention.

FIG. 6A and FIG. 6B are side views of one embodiment of the passageway door assembly 112 for the animal trap apparatus of FIG. 3 in a closed position and open position respectively, in accordance with embodiments of the invention. The passageway door assembly 112 slopes from hinge assembly 115 downward toward bottom structure 120. As illustrated in FIG. 6A, in one embodiment, the extension end 502 extends below the bottom structure 120, bearing on and being constrained by the stop member 510. The passageway door assembly 112 may be configured to slope downward toward the direction of the center of the enclosure 101. After an animal passes beyond the passageway door assembly 112, it is unlikely that the animal will try to escape back through the passageway 130, as discussed above. However, if the animal does attempt to escape through the passageway 130 the animal must pull the passageway door assembly 112 toward itself to open the passageway door assembly 112. However, the because the extension end 502 extends beyond the bottom structure 120 the animal is precluded from reaching the end of the extension end 502 to open the passageway door assembly 112. Moreover, if the animal succeeds pulling the passageway door assembly 112 towards itself, the animal's body would interfere with the extension end 502, further preventing the passageway door assembly 112 from opening.

FIGS. 7A and 7B are a partial enlarged views of one embodiment of the hinge mechanism 115 in a closed position and open position respectively in accordance with embodiments of the invention. In one embodiment, the hinge mechanism 115 cooperates with top structure 104, cross member 505 and ties 503 to form the biasing force. For example, the spring member 501 in the closed position is disposed just below the top structure 104 and is constrained proximate cross member 505 by ties 503. When the passageway door assembly 112 is opened as illustrated in FIG. 7B, the spring member 501 impinges on a lower portion of the top structure 104. In one embodiment, the spring member 501 bears against the top structure 104 and, due to force provided by being constrained by ties 503 proximate the cross-member 505, spring member 501 deflects under the rotational pressure. The deflection provides the passageway door assembly 112 with the closure bias force. In another embodiment, the top structure 104 deflects when the spring member 501 is pressed up against the top structure 104 as the passageway door assembly 112 is rotated from a closed position to an open position. In yet another embodiment both top structure 104 and spring member 501 may deflect under rotational pressure as the passageway door assembly 112 is rotated from a closed position to an open position.

The inventor has noted that in operation, embodiments of the present invention have been exceedingly effective in humanely capturing large numbers of subject animals. For example, farmers and ranchers have routinely captured one to two dozens of animals, or more, at one time in the same cage. Customers frequently report being able to remove over eighty percent of a squirrel population infesting their orchards, farms, and ranches, overnight. Recent articles in professional journals have reported instances of farmers clearing their property of over ninety-five percent of the squirrel population within days using embodiments of the present invention when no other traps were effective at removing more than one or two at a time.

While the foregoing is directed to embodiments of the present invention, other and further embodiments of the invention may be devised without departing from the basic scope thereof, and the scope thereof is determined by the claims that follow.

The invention claimed is:

1. An enclosure, comprising;
    a means for directing one or more animals to a center portion of the enclosure;
    a means for enclosing an end of the directing means while allowing the one or more animals to enter the enclosure, the enclosing means configured to prevent the one or more animals from escaping the enclosure once they have passed the enclosing means;
    a means for urging the enclosing means to a closed position and allowing the enclosing means to be repeatedly opened to accept the one or more animals without being reset;
    a means for extending a portion of the enclosing means exterior to the enclosure when the enclosing means is in the closed position such that the one or more animals may open the enclosing means to enter the enclosure, and the one or more animals after entering the interior of the enclosure are prevented from escaping the enclosure by opening the enclosing means once the enclosing means has moved to a closed position.

2. The enclosure of claim 1, wherein the means for directing comprises a passageway that extends from an opening in a sidewall of the enclosure toward the center portion of the enclosure.

3. The enclosure of claim 1, wherein the means for enclosing an end of the directing means comprises a door structure disposed within the directing means.

4. The enclosure of claim 1, wherein the means for biasing the enclosing means comprises a spring member, the spring member configured to generate a sufficient bias force to keep the enclosing means in a closed position.

5. The enclosure of claim 1, wherein the means for extending a portion of the enclosing means exterior to a wall of the enclosure comprises an extension member extending from the enclosing means, wherein the extension member is configured to extend though a sidewall of the enclosure to prevent the one or more animals from reaching an end of the enclosing means for operation thereof.

6. The enclosure of claim 1, wherein the enclosure further comprises a wire mesh body forming a sufficient lattice structure to prevent animals from escaping therefrom.

7. The enclosure of claim 1, wherein the enclosure further comprises an animal release means.

8. An animal trap apparatus, comprising:
    an enclosure having a passageway configured to receive an animal to be trapped therein, the passageway being configured to direct the at least one animal toward the center of the enclosure;
    a door disposed within the passageway, the door being configured with a pivotal end to allow the animal to enter the enclosure by pivoting the door from a closed position to an open position, the door being sized to block the passageway sufficiently to prevent the animal from escaping from the enclosure once the animal has entered the enclosure and the door has returned to the closed position;

a bias mechanism which biases the door to the closed position. the bias mechanism2 integral to the pivotal end; and an extension end of the door disposed distal the pivot end, the extension end extending exterior to the enclosure when the door is in the closed position, the extension end configured to prevent the animal trapped within the enclosure from operating the door once the animal has entered the enclosure and the door is biased to the closed position.

9. The animal trap apparatus of claim 8, wherein the enclosure further comprises a closable animal release opening, the closable animal release opening being sized to allow an animal to exit from the enclosure once the animal release opening is opened.

10. The animal trap apparatus of claim 8, wherein the passageway extends from an exterior wall of the enclosure toward the center of the enclosure.

11. The animal trap apparatus of claim 8, wherein the bias mechanism further comprises a spring member coupled to the pivotal end.

12. The animal trap apparatus of claim 11, wherein the spring member comprises a bowed elongated member, wherein the bowed elongated member is configured to generate the bias when the door is rotated from the closed position to the open position.

13. The animal trap apparatus of claim 11, wherein the spring member comprises a bias structure that interacts with a top portion of the enclosure to form the bias mechanism.

14. The animal trap apparatus of claim 8, wherein the extension end further comprises a forked structure that extends through a wall of the enclosure and cooperates with a portion of the enclosure to hold the door in the closed position when being biased by the bias mechanism.

15. An animal trap, comprising:

an enclosure having an entrance passageway, the entrance passageway configured to direct an animal toward a center of the enclosure;

a passageway door configured to be repeatedly opened inwardly relative the center of the enclosure to expose the entrance passageway and allow the animal to pass therethough into the enclosure;

a bias apparatus coupled to the passageway door, the bias apparatus configured to bias the passageway door sufficiently to allow the animal to open the passageway door against the bias and enter the entrance passageway, the bias apparatus further configured to urge the door to a closed position to obstruct the entrance passageway and prevent the animal from exiting the enclosure once the animal has passed the passageway door and into the entrance passageway leading to the center of the enclosure;

an extension member distal a rotational axis of the passageway door and extending from an end of the passageway door through an opening in the enclosure and externally therefrom when the passageway door is in the closed position; and a stop member disposed across the passageway door, the stop member being configured to cooperate with the extension member to prevent the passageway door from being opened by the animal once the animal has passed the passageway door allowing the passageway door to rotate to the closed position.

16. The animal trap of claim 15 wherein the entrance passageway extends from an exterior wall of the enclosure toward the center of the enclosure.

17. The animal trap of claim 15, wherein the enclosure further comprises an animal release opening.

18. The animal trap of claim 17, wherein the enclosure further includes an animal release door configured to cover the animal release opening.

19. The animal trap of claim 15, wherein the bias apparatus further comprises an elongated member formed in a semicircular shape, wherein as the passageway door is operated, the elongated member is deformed to produce the passageway door bias.

20. The animal trap of claim 15, wherein the extension member is integral to the passageway door and extends therefrom away from the rotational axis of the passageway door.

* * * * *